United States Patent Office 3,485,866
Patented Dec. 23, 1969

3,485,866
PROCESS FOR THE PRODUCTION OF ESTERS AND NITRILES OF UNSATURATED ALIPHATIC CARBOXYLIC ACIDS
Hans-Helmut Schwarz and Karl Morgenstern, Krefeld, Germany, assignors to Farbenfabriken Bayer Aktiengesellschaft, Leverkusen, Germany, a German corporation
No Drawing. Filed Mar. 15, 1965, Ser. No. 439,931
Claims priority, application Germany, Mar. 28, 1964, F 42,459
Int. Cl. C07c 121/30, 121/32, 69/54
U.S. Cl. 260—465.9                6 Claims

ABSTRACT OF THE DISCLOSURE

Production of lower alkyl esters and nitriles of unsaturated lower aliphatic carboxylic acids by splitting off hydrogen chloride from the corresponding lower alkyl esters and nitriles of chlorinated lower aliphatic carboxylic acids by reaction with water (i.e. steam) in gaseous phase and at a temperature of between about 350–750° C., e.g. at a residence time of about 0.01–10.0 seconds and with about 0.1–10 parts by weight of water per part by weight of the chlorinated compound.

---

The present invention is concerned with a process for the production of esters and nitriles of unsaturated aliphatic carboxylic acids.

It is known to produce esters and nitriles of unsaturated aliphatic carboxylic acids by splitting hydrogen chloride from the esters and nitriles of chlorinated aliphatic carboxylic acids in the presence of agents splitting off hydrogen chloride. The reaction takes place either in the liquid phase or in the gaseous phase.

When the reaction takes place in the liquid phase, alkali metal or alkaline earth metal hydroxides or alkali metal or alkaline earth metal salts of carbonic acid or of other weak inorganic or organic acids, or also ammonia or organic bases derived from ammonia, such as amines, are used in stoichiometric amounts in order to split off and combine with the hydrogen chloride. The disadvantages of this method consist, inter alia, not only in a frequently low conversion and poor yield but also in that large amounts of hydrochlorides are formed which must be removed and are of little use.

When the reaction is carried out in the gaseous phase, the esters and nitriles of the chlorinated aliphatic carboxylic acids are passed in the gaseous state, possibly diluted with inert gases, such as nitrogen or carbon dioxide, and possibly under reduced pressure, over solid catalysts, such as aluminium oxide, silicates or active charcoal, or with the addition of catalysts which simultaneously evaporate, for example amines or carboxylic acid amides. The necessary reaction temperatures are in the region of between about 350 and about 550° C. One disadvantage of this reaction in the gaseous phase, especially at higher temperatures, is that carbon black is deposited, due to the thermal instability of the starting materials, and these deposits block the reaction chamber and, if the process is carried out with solid catalysts, settle on the latter and thus impair their action. However, higher temperatures are desirable for increasing the conversion.

We have now found that the mentioned disadvantages can be avoided and esters and nitriles of unsaturated aliphatic carboxylic acids can be obtained in large yields and with a high conversion, by splitting off hydrogen chloride from esters and nitriles of chlorinated aliphatic carboxylic acids in the gaseous phase at elevated temperatures by briefly heating the gaseous esters and nitriles, mixed with steam, at temperatures between about 350 and about 750° C.

Surprisingly, in spite of the comparatively high temperatures, no saponification of the esters and nitriles by the steam takes place. Furthermore, no marked decompositions take place which otherwise occur at the reaction temperatures required for the thermal splitting off of hydrogen chloride and which cause the formation of carbon black which impair the process. In addition, in the process according to the present invention, high yields are obtained, even in the case of very short residence times. The use of catalysts is not necessary.

The reaction is expediently carried out in such a manner that the esters or nitriles and water are evaporated either separately or together and the vapour mixture is subsequently heated to the reaction temperature in a suitable device, for example, a reaction tube of corrosion-resistant material. The reactor used may be empty or filled, for example, with ceramic or other fillers. After leaving the reactor, the reaction mixture is condensed in the usual manner, for example, a cooling device or by introducing a jet of water through a nozzle. It thus separates into an organic and an aqueous phase. The latter contains the hydrogen chloride which has been split off. The organic phase, possibly after washing and neutralising, is worked up by fractional distillation. Unreacted starting products can again be returned to the reactor.

The reaction according to the present invention can be carried out at atmospheric pressure or at a reduced pressure. In general, good yields are achieved within a temperature range of about 350 to about 750° C. but it is frequently expedient to carry out the reactions at temperatures of about 500 to about 650° C., whereby especially good yields can be obtained. High conversions can be achieved with residence times of about 0.01 to about 10.0 seconds, especially 0.5 to 2 seconds, without the formation of carbon black.

The ratio of esters or nitriles to steam can vary within wide limits. In general, it is expedient to use about 0.1 to about 10 parts by weight of water per one part by weight of ester or nitrile. Especially good yields are frequently attained by the addition of about 0.5 to about 3 parts by weight of water per one part by weight of ester or nitrile.

Esters and nitriles of chlorinated aliphatic carboxylic acids which can be converted by the process according to the present invention into the corresponding unsaturated compounds, are for example, the alkyl esters, such as the methyl, ethyl and propyl esters, i.e. lower alkyl or $C_{1-3}$ esters, and the nitriles of chlorinated aliphatic mono- and dicarboxylic acids, for example, of $\alpha$- and $\beta$-chloropropionic acid and $\alpha$- and $\beta$-chlorobutyric acid, -isobutyric acid and -valerianic acid (pentanoic or valeric acid=valerianic acid), i.e. of $\alpha$- or $\beta$- monochlorinated lower aliphatic hydrocarbon carboxylic acids whereby to form the corresponding mono-olefinically unsaturated hydrocarbon compound. Such mono-olefinically unsaturated aliphatic hydrocarbon compounds include the corresponding acrylic, methacrylic, crotonic and pentenoic acid esters and nitriles.

The following examples are given for the purpose of illustrating the present invention, the parts being parts by weight.

EXAMPLE 1

One part $\alpha$-chloro-isobutyric acid methyl ester and one part water are evaporated and passed together, with an average residence time of 0.7 second, through a ceramic reactor heated to 600° C. The reaction mixture obtained is subsequently cooled, the organic phase separated, washed with water, neutralised by shaking with an aqueous sodium carbonate solution, dried over anhydrous sodium sulphate and fractionated. The conversion is 98% and the yield of methacrylic acid methyl ester is 96% of the reacted α-chloroisobutyric acid methyl ester.

EXAMPLE 2

One part β-chloroisobutyric acid methyl ester and one part water are reacted and worked up as in Example 1. The conversion is 40% and the yield of methacrylic acid methyl ester is 85% of the reacted β-chloro-isobutyric acid methyl ester.

EXAMPLE 3

One part α-chloroisobutyric acid nitrile and one part water are reacted at 550° C. and with a residence time of 1.5 seconds and worked up as in Example 1. The conversion is 70% and the yield of methacrylonitrile is 88% of the reacted α-chloroisobutyric acid nitrile.

EXAMPLE 4

One part α-chloroisobutyric acid ethyl ester and one part water are reacted and worked up as in Example 1. The conversion is 85% and the yield of methacrylic acid ethyl ester is 91% of the reacted α-chloroisobutyric acid ethyl ester.

EXAMPLE 5

One part α-chloropropionic acid methyl ester and 2 parts water are reacted with a residence time of 1.5 seconds and worked up as in Example 1. The conversion is 60% and the yield of acrylic acid methyl ester is 90% of the reacted α-chloropropionic acid methyl ester.

EXAMPLE 6

One part α-chloropropionic acid nitrile and 2 parts water are reacted at 550° C. and with a residence time of 1.5 seconds and worked up as in Example 1. The conversion is 51% and the yield of acrylonitrile is 79% of the reacted α-chloropropionic acid nitrile.

EXAMPLE 7

One part β-chloropropionic acid ethyl ester and 2 parts water are reacted with a residence time of 1.5 seconds and worked up as in Example 1. The conversion is 30% and the yield of acrylic acid ethyl ester is 82% of the reacted β-chloropropionic acid ethyl ester.

EXAMPLE 8

One part α-chlorobutyric acid methyl ester and 1 part water are reacted and worked up as in Example 1. The conversion is 85% and the yield of crotonic acid methyl ester is 85% of the α-chlorobutyric acid methyl ester used.

We claim:

1. In the process for the production of lower alkyl esters and nitriles of α,β-mono-olefinically unsaturated lower aliphatic hydrocarbon carboxylic acids, the improvement which consists essentially of reacting water and a chlorinated compound selected from the group consisting of lower alkyl esters and nitriles of α-monochlorinated and β-monochlorinated saturated lower aliphatic hydrocarbon carboxylic acids, in gaseous phase at a temperature between about 350 and 750° C., in a ratio of substantially between about 0.1 and 10 parts by weight of water per part by weight of said chlorinated compound for a period of substantially between about 0.01 and 10.0 seconds, to split off hydrogen chloride and thereby form the corresponding mono-α,β-olefinically unsaturated lower aliphatic hydrocarbon carboxylic compound.

2. Process for the production of lower alkyl esters and nitriles of α,β-mono-olefinically unsaturated lower aliphatic hydrocarbon monocarboxylic acids, which consists essentially of reacting water and a chlorinated compound selected from the group consisting of lower alkyl esters and nitriles of α-chlorinated and β-chlorinated saturated $C_{3-5}$ aliphatic hydrocarbon monocarboxylic acids, in gaseous phase at a temperature substantially between about 350 and 750° C. in a ratio of substantially between about 0.1 and 10 parts by weight of water per part by weight of said chlorinated compound for a period of substantially between about 0.01 and 10.0 seconds, to split off hydrogen chloride and thereby form the corresponding α,β-mono-olefinically unsaturated lower aliphatic hydrocarbon carboxylic compound.

3. Process according to claim 2 wherein the reaction is carried out at a residence time of between about 0.5 and 2 seconds.

4. Process according to claim 3 wherein said water is used in the ratio of between about 0.5 and 3 parts by weight per part by weight of said chlorinated compound.

5. Process for the production of α,β-unsaturated acid compound selected from the group consisting of $C_{1-3}$ alkyl esters and nitriles of acrylic, methacrylic, crotonic and pentenoic acids, which consists essentially of reacting a mixture of water and a chlorinated compound selected from the group consisting of $C_{1-3}$ alkyl esters and nitriles of α-chloro- and β-chloro-propionic, butyric, isobutyric and valeric acids, in gaseous phase at a temperature substantially between about 350 and 750° C. in a ratio of substantially between about 0.5 and 3 parts by weight of water per part by weight of said chlorinated compound for a period of substantially between about 0.5 and 2 seconds, to split off hydrogen chloride and thereby form the corresponding said unsaturated acid compound.

6. Process according to claim 5 wherein the reaction is carried out at a temperature between about 500 and 650° C.

References Cited

UNITED STATES PATENTS

| 2,245,547 | 6/1941 | Pollack | 260—486 |
| 2,301,131 | 11/1942 | Lichty | 260—465.9 |
| 2,385,549 | 9/1945 | Spence | 260—465.9 |
| 2,890,241 | 6/1959 | Holman et al. | 260—486 |
| 3,312,729 | 4/1967 | Moore et al. | 260—465.7 |

JOSEPH P. BRUST, Primary Examiner

U.S. Cl. X.R.

260—465.8, 485, 486